(No Model.) 2 Sheets—Sheet 1.
W. R. ELLIOTT.
CONDUIT FOR ELECTRIC RAILWAYS.

No. 435,486. Patented Sept. 2, 1890.

Witnesses,
J. M. Witherow
N. L. Collamer

Inventor
William R. Elliott,
By his Attorneys
C. A. Snow & Co.

(No Model.) 2 Sheets—Sheet 2.
W. R. ELLIOTT.
CONDUIT FOR ELECTRIC RAILWAYS.
No. 435,486. Patented Sept. 2, 1890.
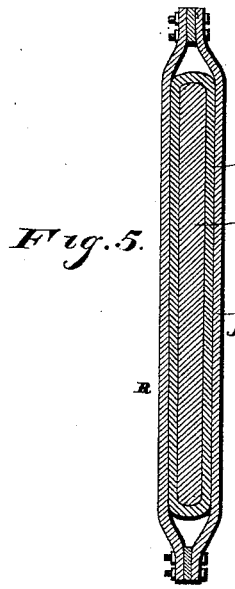
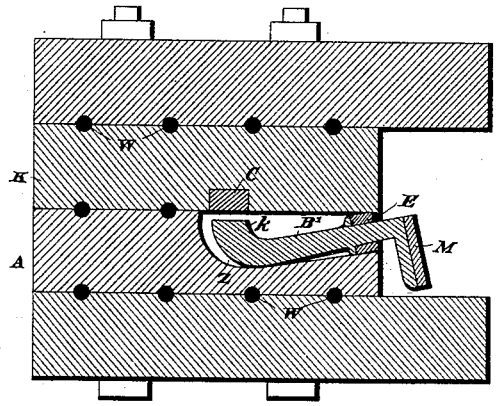
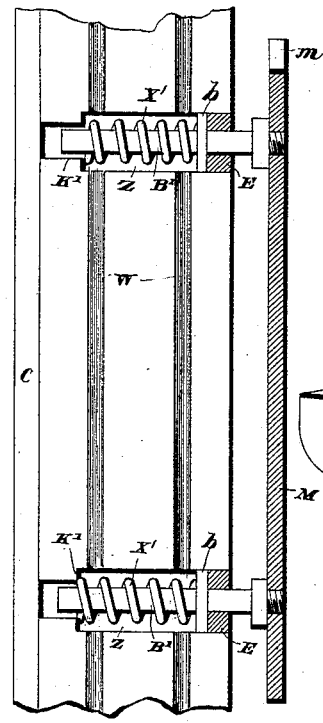
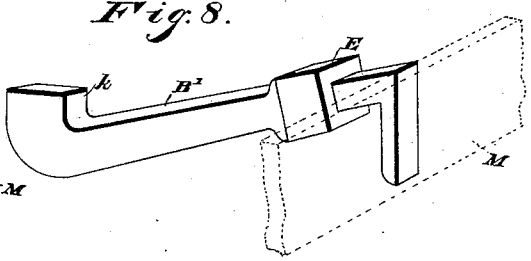
Witnesses.
Inventor
William R. Elliott,
By his Attorneys
C. A. Snow & Co.

UNITED STATES PATENT OFFICE.

WILLIAM R. ELLIOTT, OF KANSAS CITY, MISSOURI.

CONDUIT FOR ELECTRIC RAILWAYS.

SPECIFICATION forming part of Letters Patent No. 435,486, dated September 2, 1890.

Application filed January 18, 1890. Serial No. 337,282. (No model.)

*To all whom it may concern:*

Be it known that I, WILLIAM R. ELLIOTT, a citizen of the United States, residing at Kansas City, in the county of Jackson and State of Missouri, have invented new and useful Conduits for Electric Railways, of which the following is a specification.

This invention relates to conduits for electric wires, more especially of that class adapted for use in connection with railway-cars which are to be driven by an electric current conveyed by such conduit through the means of a contact-piece or trolley carried by the car, and adapted to convey a constant current, either of single or alternating polarity and of the right potential, to the car for the purpose of propelling the same.

To this end my invention consists of a conduit containing a single uninsulated wire, one of the sides of the conduit being made movable, strips, pieces, or studs being seated in said movable side of the conduit, and a moving contact-piece or trolley carried by the car and adapted to bear upon the outer side of said movable side to press the contact-pieces into contact with the conductor, and thereby to form an electrical connection between the trolley and the conductor and that point.

The invention also consists of other details of construction and arrangement of parts, as hereinafter pointed out.

Figure 1:
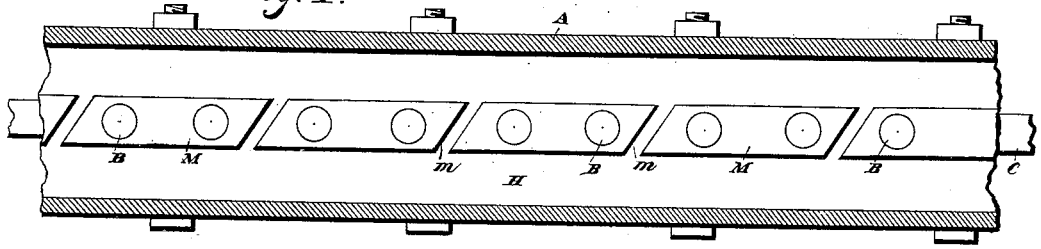
Figure 2:
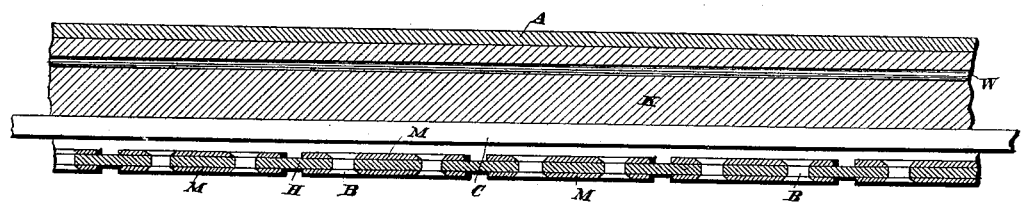
Figure 3:
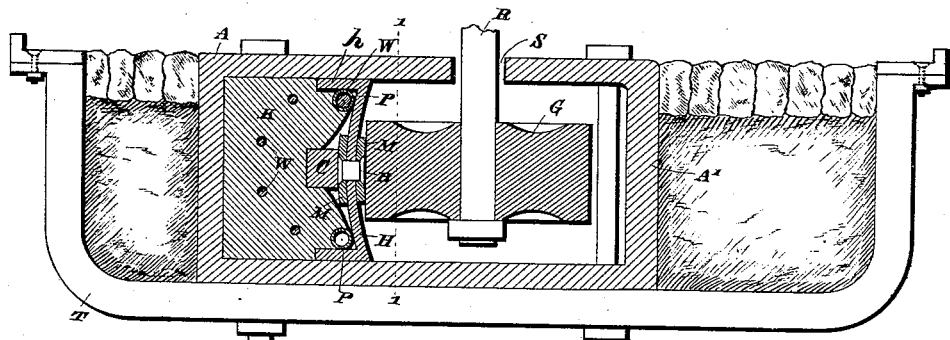
Figure 4:
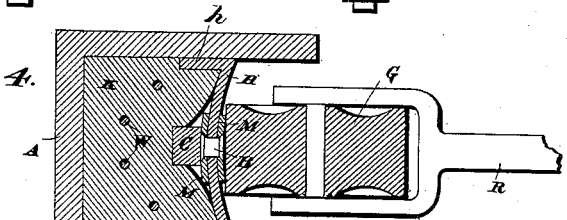

In the accompanying drawings, Figure 1 is a vertical sectional view of a section of my conduit proper of the elastic side form on the line 1 1 of Fig. 3. Fig. 2 is a horizontal section of the same. Fig. 3 is a transverse section of the conduit, showing it as adapted for use in connection with a contact-piece carried by a car and projecting below the level of the earth through a suitable slot in the casing. Fig. 4 is a section similar to Fig. 3, showing the device adapted for use in connection with a contact-piece projecting from the side or from the top of the car. Fig. 5 is a cross-section of the bar supporting the contact device. Fig. 6 is a cross-section of my conduit in its preferred form. Fig. 7 is a horizontal section of a modified form. Fig. 8 is a perspective detail.

Referring to the drawings, the letter A represents an approximately U-shaped casing composed of earthenware, as terra-cotta, or of any other suitable non-conducting material suitably cheap and strong, and in the elastic side form of my invention H represents a flexible plate, also of non-conducting material, which occupies and closes the fourth side of the conduit, the latter being preferably rectangular in cross-section, as shown.

Within the casing A is a suitable filling-body K—such as sawdust or other non-conductive material—which is used for filling said casing, and within which longitudinal wires W may be arranged, if desired, for the purpose of carrying telegraphic, telephonic, or electric-light currents, although these wires form no part of the present invention. The edges of the plate H are preferably made with flanges $h$, which closely fit inside the side pieces of the casing A, and just inside these flanges and against the inner face of the plate H, I preferably arrange longitudinal rubber tubes P, which may also carry electric wires for any suitable purpose, if desired. The filling-body K, which is preferably put into the casing in a soft or plastic state, holds these tubes in place and also holds the flanges $h$ against the sides of the casing. The filling K at its center is depressed, and in a longitudinal groove formed therein I seat the main conductor C. In the present instance I have shown but one conductor, although it will be understood that more than one can be employed, if desired, and they can be located side by side, and the contacting device can be duplicated, when it is desired, either to convey two currents to the car or to make a complete circuit through the car and returning through one conductor. Throughout the length of the plate H, I attach to its two sides metallic contact-plates M, whose ends are out of contact with each other, but are preferably beveled, dovetailed, or otherwise arranged, as shown at $m$, so as to break joints with each other. The plates M upon the inner side of the insulating-plate H correspond in size and shape with those on the exterior thereof, and are of such thickness as to be normally held by the elastic plate H out of contact with the conductor C. The two series of plates M M are connected with each other by metallic bolts or rivets B passing through their bodies and through the intervening plate H.

From the above description it will be seen that if a contact piece or roller be passed along the outer faces of the plates M and be pressed against them with considerable force the inner plates M will be pressed into contact with the conductor C and an electrical current will be transmitted from the conductor at that point into the inner plate M, through the bolts or rivets B, to the outer plate M, and from thence may be led through the contact piece or roller to whatever point is desired. It will also be seen that as the roller progresses along the conduit it passes from the end of one plate M to the adjoining end of the next plate without interrupting the flow of the current on account of the break-joint form of said ends, and also that the plates M in advance and in rear of the point where the roller is pressing one of them into contact with the conductor will be carried out of such contact by the force of the elastic plate H, assisted by the tubes P.

In Fig. 3 I have shown my conduit as located between the rails of a track and mounted upon the tie T thereof, a complementary strip A' being preferably so placed as to leave a central slot S between the rails, through which projects an arm R, carrying the contact-roller G at its lower end. It will be understood that as the car moves along the track the roller G is carried with it and makes a progressive contact with the conductor C, and that the latter is located beneath the surface of the ground and out of all possible reach by person or animal, as well as by the elements. The arm R is preferably made as shown in Fig. 5, wherein c is the conductor surrounded by insulating material i, and this in turn surrounded by a strong metallic frame f. It will of course be understood that when it is desired to cut off the flow of the current the communication between the metallic roller G and the car can be broken by any well-known means.

In Fig. 4 I have shown my elastic side conduit as mounted upon a base X, whereby it is held above the ground at any suitable height, and whereby it may be located along the side of the track, and the arm R may project from the side of the car and can make contact through its roller G in the manner above described. It will be understood that if it is desired the conduit A may be supported above the car with its plate H on its lower side, and the arm R may project from the top of the car, whereby the device will serve all the purposes of a trolley; but as this construction is almost exactly similar to that shown in Fig. 4 I have not illustrated it.

By the peculiar construction and arrangement of the parts of the above conduit the casing A and plate H, which are both of insulating material and are water-proof, entirely surround and protect the conductor C, whereby loss of electrical energy is avoided and access to the conductor by persons, either accidentally or maliciously, is prevented. Within this casing the filling K is placed, which surrounds the conductor C on all sides except one, and which may also contain wires for other purposes—as, for instance, for use by the railroad.

Referring now to Fig. 6, which illustrates the preferred form of my improved conduit, A is the casing, composed preferably of a number of horizontal pieces of earthenware, terra cotta, or other suitable non-conducting material, clamped together by vertical bolts or by bands passing around them. The interior pieces are somewhat shorter than the upper and lower pieces, and are thereby made to constitute the filling K, and the adjacent faces of all these pieces are provided with semicircular grooves, which, when the parts are assembled, form longitudinal openings W for the reception of telegraph or telephone wires. The inner pieces K are flush at one edge with the top and bottom pieces, whereby a recess is formed along the opposite edge of the conduit, and this recess is adapted to receive metallic plates M, similar to those shown in Fig. 1—that is to say, with their ends m beveled or notched so as to break joint, but out of contact with each other.

In this instance the letter B' represents a metallic bar, of which there is preferably one near each end of each plate M, and the bodies of these bars pass through holes in the bottom of the longitudinal recess and lie normally in the bottom of apertures Z within the filling K, as shown in Fig. 6. In this instance the inner ends of the bars are provided with heads k, the weight whereof normally holds the plates M at an angle, as shown. It will be understood, therefore, that when the wheel G bears against the plate M the head k of the bar B will be thrown upwardly and will make electrical contact with the conductor C, the bars B' and plates M returning to their normal positions as soon as the roller passes off the ends of each of the successive plates.

Around the body of the bar B', where it passes into the apertures Z, I preferably locate a rubber bushing E, which not only prevents the loss of electric power, but also seals the conduit and makes it air and water tight.

In the construction shown in Fig. 7 the arrangement of these parts is almost the same, except that the bar B slides through the apertures Z and through a rubber bushing E into contact with and against one side of the conductor C, and is returned to its normal position by means of a spring X', coiled around the bar and between a shoulder b thereon and a shoulder K' in the aperture Z in the filling. In this instance the roller G presses the plate M against the force of the spring and into electrical contact with the conductor, the parts returning to their normal position as soon as the roller passes from the end of each successive plate onto the next plate.

Having thus described my invention, what I claim is—

1. An electric conduit consisting of a casing having flexible pieces in one side, a conductor within said casing, and metallic bars passing through and held in place by said flexible pieces, the inner ends of the bars being normally below and out of contact with the conductor, as and for the purpose set forth.

2. The combination, with the arm R, carried by the car, and the contact-roller G, mounted thereon, of the fixed conductor C, having flexible pieces in one side, metallic pieces passing through said flexible pieces and held thereby normally below and out of contact with the conductor, but adapted to be lifted into contact therewith by the roller G, as and for the purpose set forth.

3. In an electrical conduit, the casing A, having the filling K, provided with the apertures Z, opening at one side of said conduit, the conductor C, passing by the inner ends of said aperture, and the rubber bushings E in the open outer ends of said apertures, in combination with the bars B', passing through said bushings with their inner ends normally out of contact with said conductor, and the plates M, carried by the outer ends of said bars, the whole constructed as and for the purpose set forth.

4. In an electric conduit, the casing A, having the filling K, provided with the apertures Z, opening at one side of said conduit, the conductor C, passing by the inner ends of said aperture, and the rubber bushings E in the open outer ends of said apertures, in combination with the bars B', their bodies passing through said bushings and their inner ends, provided with weighted heads $k$, standing normally below and out of contact with said conductor, and the plates M, secured to the outer ends of said bars and standing normally at an angle with the side of the conduit, the whole constructed as and for the purpose set forth.

In testimony that I claim the foregoing as my own I have hereto affixed my signature in presence of two witnesses.

WILLIAM R. ELLIOTT.

Witnesses:
HOMER H. YOUNG,
BERTIE DEE.